2,835,655

PRODUCTION OF WATER-SOLUBLE AROMATIC RESIN SULFONATES BY SULFONATING WITH SO₃ IN LIQUID SO₂

William C. Bauman, Midland, and Harold H. Roth, Bay City, Mich., assignors to The Dow Chemical Company, Midland, Mich., a corporation of Delaware No Drawing. Application August 19, 1953
Serial No. 375,283

8 Claims. (Cl. 260—78.5)

This invention concerns an improved method for the production of water-soluble sulfonates of resinous aromatic materials. It pertains more particularly to the sulfonation of certain solid thermoplastic copolymers of alkenyl aromatic compounds such as styrene, vinyltoluene, or vinylxylene, etc., in the presence of liquid sulfur dioxide as a reaction medium.

It is known that the resin sulfonates obtained by sulfonating polystyrene, or any of a variety of other solid thermoplastic polymers of alkenyl aromatic compounds vary widely in properties, e. g. from being solid water-insoluble materials to being gummy masses which are also insoluble, or only partially soluble, in water, to being non-gummy materials which are partially or completely soluble in water, depending on the conditions under which the sulfonation is carried out. Water-soluble sulfonates of polystyrene have heretofore been prepared by dissolving polystyrene in a liquid polychlorinated aliphatic hydrocarbon such as carbon tetrachloride, or chloroform, etc., and treating the solution with a highly reactive sulfonating agent such as chlorosulfonic acid. Even when operating in such manner, the properties of the product, e. g. the ease or completeness with which it can be dissolved or dispersed in water and its effectiveness in increasing the viscosity of water to which it is added, vary considerably with slight changes in one or more of the reaction conditions such as the kind or proportion of the sulfonating agent, the order or rate of mixing the starting materials, and the reaction temperature, etc. For these reasons it is difficult, even when operating on a laboratory scale, to sulfonate successive batches of a polymer and obtain the same quality of sulfonated product. The difficulty of reproducing the results becomes greater as the quantity of material handled is increased, e. g. from laboratory amounts to a commercial scale. Many of the erratic results which have been obtained are attributed to occurrence of side reactions such as a reaction between a portion of the sulfonating agent and the polychlorinated aliphatic hydrocarbon used as the reaction medium, cleavage of the polymer molecules, and formation of sulfone-type cross-linkages between the polymer molecules. In addition to the difficulties just mentioned, the sulfonated polymers usually contain ionizable impurities such as unconsumed sulfonating agent, sulfuric acid, or hydrochloric acid, and, in some instances, inorganic salts such as sodium sulfate or sodium chloride, etc., and extra steps are required for removal of the impurities.

In a copending application, Serial No. 272,888, filed February 21, 1952, now Patent No. 2,691,644, of H. H. Roth, it is disclosed that many of the above difficulties involved in producing water-soluble sulfonated resins can be avoided by sulfonating polystyrene, or similar resins, with sulfur trioxide in the presence of a liquid mixed solvent consisting of sulfur dioxide and a polychlorinated aliphatic hydrocarbon such as carbon tetrachloride, or tetrachloroethylene, etc. However, the polymers then tested could not satisfactorily be sulfonated to obtain water-soluble products when using either of the individual ingredients of said mixed solvent as the reaction medium. This fact is indicated in the application.

It has now been found that there are a number of solid thermoplastic polymers composed principally of alkenyl aromatic compounds, e. g. styrene, or ar-vinyltoluene, etc., which can satisfactorily be sulfonated in the presence of liquid sulfur dioxide as a medium to obtain water-soluble sulfonated resin products. By "water-soluble" it is meant that the sulfonated resins can be dissolved, or dispersed by stirring, directly in water to form a substantially homogeneous liquid body, e. g. a true or a colloidal solution thereof.

It has further been found that use of liquid sulfur dioxide as the sulfonation medium is advantageous in that the sulfur dioxide is inert to the sulfur trioxide and in that the sulfonated resin product precipitates therefrom leaving most, if not all, of the impurities, e. g. unconsumed sulfur trioxide, dissolved in the liquid sulfur dioxide which may be drained or washed from the product to obtain the latter directly in a form of good purity. Any liquid sulfur dioxide retained on surfaces of the product is readily removed by vaporization.

It has still further been found that the alkenyl aromatic resins that can be sulfonated by the present method to form water-soluble resin sulfonates vary considerably as regards the extent to which they undergo one or both of the aforementioned side-reactions during the sulfonation. The copolymers of nuclear alkylated styrene compounds such as ar-vinyltoluene, ar-vinylxylene, or ar-ethylstyrene, which are suitable for use in the present process are more resistant to occurrence of side reactions, especially formation of cross-linkages between the polymer molecules, than are the corresponding copolymers of styrene, and are preferred.

The solid, thermoplastic alkenyl aromatic resins that can be reacted with sulfur trioxide in the presence of liquid sulfur dioxide as the reaction medium to form water-soluble resin sulfonates are ones containing a total of at least 60 percent by weight of at least one chemically combined monoalkenyl aromatic compound having the general formula:

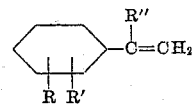

wherein R, R' and R" independently represent members of the group consisting of hydrogen and lower alkyl radicals, especially the methyl radical, and which have present in the resin molecule a functional group that renders the resin soluble, or readily dispersible, in liquid sulfur dioxide. Stated another way, any alkenyl aromatic resin that can, by moderate stirring, be dissolved, or dispersed, in liquid sulfur dioxide to form a clear or cloudy liquid body free from a distinct separate layer or precipitate of resinous material can satisfactorily be sulfonated by the method of the invention, and such resins containing 60 percent by weight or more of an alkenyl aromatic compound can be sulfonated to obtain water-soluble resin sulfonates. A simple test to determine whether a given alkenyl aromatic resin of the above stated composition is suitable for use in the process of the invention is to form a mixture of 5 parts by weight of the finely divided resin and 95 parts of liquid sulfur dioxide, shake the mixture in a closed pressure-resistant vessel at 30° C. for 2 hours, and then allow the mixture to stand without agitation at 30° C. for another 5 minutes. If the mixture is then substantially homogeneous, i. e. if it is a clear or cloudy liquid free of a distinct separate layer, or precipitate, the resin can satisfactorily be used in the sulfonation process of the invention, but if the mixture consists of two or more distinct layers, the resin is not suitable for use in the method. The homopolymers of vinyl aromatic hydrocarbons such as styrene or vinyltoluene fail to meet this test, i. e. the mixtures formed comprise a layer of liquid sulfur dioxide and a distinct layer of the resin which usually is in a swollen, gummy condition. When attempt is made to sulfonate polystyrene or the homopolymer of vinyltoluene by the procedure of the invention, the sulfonated product usually comprises a considerable amount of resinous material that is insoluble and not dispersible by stirring, in water.

Examples of solid, thermoplastic alkenyl aromatic resins which can be sulfonated with sulfur trioxide in liquid sulfur dioxide as the medium to obtain water-soluble resin sulfonates are the copolymers of from 70 to 98 weight percent of styrene and from 30 to 2 percent acrylonitrile; copolymers of from 65 to 98 percent ar-vinyltoluene and from 35 to 2 percent acrylonitrile; copolymers of styrene, vinyltoluene and from 2 to 35 percent acrylonitrile; copolymers of from 60 to 75 percent alpha-methylstyrene, 20 to 25 percent acrylonitrile, and 5 to 10 percent ethyl methacrylate; copolymers of styrene and sulfur dioxide; copolymers of from 68 to 95 percent of either or both of the compounds styrene and ar-vinyltoluene and from 5 to 32 percent of maleic anhydride; copolymers of from 60 to 87 percent of either or both of the compounds styrene and ar-vinyltoluene and from 13 to 40 percent of methyl methacrylate; the copolymer of 75 percent styrene and 25 percent ethyl acrylate; and copolymers of styrene or ar-vinyltoluene with from 2 to 10 percent of methyl isopropenyl ketone; etc. All of the copolymers just mentioned are alkenyl aromatic resins which contain in the polymer molecule a non-olefinic aliphatic radical, such as a carbonyl, a carbonyloxy, or a nitrile radical, having a carbon atom attached by more than one valence to another atom, e. g. of oxygen or nitrogen, etc. The presence of such radical, or radicals, is apparently necessary for satisfactory employment of the resins in the process of the invention. However, the presence of too small or too large a proportion of such radicals in the copolymer molecules sometimes prevents satisfactory employment of the copolymers in the process of the invention. For instance, copolymers of styrene and acrylonitrile which contain less than 2, or more than 30 percent by weight of chemically combined acrylonitrile are not readily dispersible in liquid sulfur dioxide and cannot satisfactorily be sulfonated to form water-soluble resin sulfonates by the method of the invention. As hereinbefore mentioned, the alkenyl aromatic resins which are suitable can be dispersed by mild stirring in 19 times their weight of liquid sulfur dioxide at 30° C. Whether a given alkenyl aromatic resin can satisfactorily be sulfonated by the present process may be predetermined by this simple test.

Although all alkenyl aromatic resins having the aforestated compositions and meeting the above test, can be sulfonated by the present method to obtain water-soluble resin sulfonates, the extent to which side reactions occur during the sulfonation and the ease of repeating a given sulfonation to obtain the same quality of product are dependent on the kind of alkenyl aromatic resin employed. The copolymers containing styrene as the only alkenyl aromatic compound chemically combined therein, tend to become cross-linked to an appreciable extent during the sulfonation reaction. The formation of a few cross-linkages between the polymer molecules tends to increase both the average molecular weight of the sulfonated resin product and its effectiveness in thickening, i. e. increasing the viscosity of, water in which it is dissolved, but extensive cross-linkage formation often renders the product insoluble and non-dispersible in water. With certain of such styrene copolymers, e. g. copolymers of styrene and sulfur dioxide, the tendencies just mentioned are offset by occurrence of scission of the polymer molecules during the sulfonation. In contrast, the corresponding copolymers of nuclear alkylated styrenes such as vinyltoluene, vinylxylene, and ethylvinylbenzene, undergo the formation of cross-linkages between the polymer molecules to a far less, and usually an inconsequential, extent during sulfonation by the method of the invention. However, certain of the copolymers of nuclear alkylated styrenes, e. g. the copolymers of vinyltoluene and sulfur dioxide, tend to undergo polymer chain scission to a considerable extent during the sulfonation. The liquid sulfur dioxide-dispersible copolymers of nuclear alkylated styrenes with acrylonitrile, or with an unsaturated carboxylic acid, or an anhydride or ester of such acid, are exceptionally resistant to occurrence of the aforementioned side reactions while being sulfonated by the present method and are preferably employed. Such copolymers are alkenyl aromatic resins containing nitrile, carbonyl, or carbonyloxy radicals as the only non-hydrocarbon portions of the copolymer molecule. Examples of these preferred alkenyl aromatic resins are the sulfur dioxide dispersible copolymers of vinyltoluene and acrylonitrile, of vinyltoluene and methyl methacrylate, of vinyltoluene and methyl acrylate, of vinyltoluene and ethyl acrylate, of vinylxylene and acrylonitrile, and of vinylxylene and methyl methacrylate, etc.

The sulfonation is accomplished at temperatures not higher than 40° C., e. g. between —40° and 40° C. and usually between —10° and 30° C., by admixing at least 0.7, usually between 0.8 and 2, molecular equivalents of sulfur trioxide with a dispersion in liquid sulfur dioxide of an amount of the alkenyl aromatic resin having a total of one molecular equivalent of one or more alkenyl aromatic compounds chemically combined in the resin. The liquid sulfur dioxide may be employed in any proportion large enough to form a substantially homogeneous dispersion of the resin starting material. The dispersion of resin in liquid sulfur dioxide usually contains 10 weight percent or less, e. g. from 1 to 5 percent, of the resin, but the latter may be present in any proportion capable of being dispersed in the sulfur dioxide. The sulfur trioxide is preferably diluted, e. g. with an equal weight or more of sulfur dioxide, before being admixed with the resin dispersion.

The sulfur trioxide and the resin dispersion may be admixed in any order, e. g. by pouring the resin dispersion into a liquid solution of sulfur trioxide in sulfur dioxide with stirring, or vice versa. The reaction can be carried out in continuous manner by feeding separate streams of the liquid sulfur dioxide-resin dispersion and of sulfur trioxide, or preferably a sulfur dioxide-sulfur trioxide solution, to a mixing and reaction zone and withdrawing the reacted mixture, e. g. as a stream, from the zone. The reaction is carried out at a pressure sufficient to maintain a dispersion of the unreacted resin in liquid sulfur dioxide. It may be carried out at atmospheric pressure when employing reaction temperatures at or below —10° C., but at higher temperatures it is carried out at superatmospheric pressure, e. g. in a bomb or autoclave. The tendency toward occurrence of the aforementioned side reactions, or the rate and extent of such side reactions, becomes greater as the reaction temperature is raised. The sulfonation reaction is exothermic. However, the reaction mixture may be maintained at the desired reaction temperature either by vaporization of a portion of the liquid sulfur dioxide or by external cooling of the reaction mixture.

The sulfonation occurs rapidly with formation of an alkenyl aromatic resin sulfonic acid which precipitates as small granules or particles. The product can be separated from the liquid sulfur dioxide in usual ways, e. g. by filtering, decanting, or centrifuging the mixture. Any unreacted sulfur trioxide or other impurities such as sulfuric acid remain, for the most part, dissolved in the liquid sulfur dioxide. The solid resin sulfonic acid product may be washed with a small portion of liquid sulfur dioxide to remove adhering mother liquor and any sulfur dioxide retained on the product may be removed by vaporization. The water-soluble alkenyl aromatic resin sulfonic acid may thus be obtained directly in a solid granular form of good purity. Since the water-soluble alkenyl aromatic resin sulfonic acids are usually deliquescent, the foregoing steps for separating the same are preferably, but not necessarily, carried out in the absence of moist air, e. g. in a closed system.

The water-soluble alkenyl aromatic resin sulfonic acids may be neutralized in usual ways with alkalies such as ammonia, or sodium or potassium hydroxide, etc., to form salts thereof. The ammonium and alkali metal salts thus obtained are soluble in water to form true or colloidal solutions thereof. They are adapted for use as sizing agents.

The following examples describe ways in which the invention has been practiced, but are not to be construed as limiting its scope.

EXAMPLE 1

In each of a series of experiments, 10 grams of a finely divided copolymer, identified in Table I, was stirred together with 250 ml. of liquid sulfur dioxide at $-10°$ C. with formation of a clear to slightly cloudy solution, presumably of colloidal nature. A separate solution of 5 ml. of liquid sulfur trioxide and 250 ml. of liquid sulfur dioxide was also formed at a temperature of $-10°$ C. The two solutions were fed simultaneously and at about equal rates by volume, in from 5 to 15 minutes, to a reaction vessel which initially contained 500 ml. of liquid sulfur dioxide. During feed of the materials, the mixture in the vessel was stirred and maintained at about $-10°$ C. Upon mixing the starting solutions, sulfonation occurred rapidly and a resin sulfonic acid precipitated as a fine powder. The product was separated by filtering, washed with diethyl ether, and dried under vacuum. A portion of the product was dissolved in water and neutralized with aqueous sodium hydroxide to form an aqueous solution containing 0.5 percent by weight of the sodium resin sulfonate. The aqueous solutions thus formed were more viscous than water. The following table identifies each solid copolymer starting material by giving the kinds and percent by weight of the monomers chemically combined therein. It also gives the viscosity in centipoises at 25° C. of each of the aqueous sodium resin sulfonate solutions that was formed. In the table styrene is abbreviated as "S," alpha-methylstyrene as "AMS," acrylonitrile as "VCN," and ar-vinyltoluene as "VT."

*Table I*

| Run No. | Copolymer of— | Viscosity of Aqueous Solution, cps. at 25° C. |
|---|---|---|
| 1 | 50% S, 27% VCN, 23% AMS | 120 |
| 2 | 95.7% S, 4.3% VCN | 1,280 |
| 3 | 81.5% S, 18.5% VCN | 720 |
| 4 | 75% VT, 25% VCN | 2,400 |

EXAMPLE 2

Another series of experiments were carried out using a procedure similar to that described in Example 1, except that the alkenyl aromatic resin starting materials were copolymers of styrene and maleic anhydride containing varying proportions of the latter. All of these copolymers, prior to being sulfonated, could be dispersed in liquid sulfur dioxide and those containing from 16 to 32 percent of maleic anhydride were readily soluble and formed clear solutions. It may be mentioned that polystyrene and a copolymer of equal parts by weight of styrene and maleic acid have each been found not to be not completely dispersible in liquid sulfur dioxide when tested as hereinbefore described. As indicated above, all of the dispersible copolymers were sulfonated with sulfur trioxide using liquid sulfur dioxide as the medium and each of the granular resin sulfonic acid products was separated, dissolved in water, and neutralized with sodium hydroxide to form a clear aqueous solution containing 0.5 percent by weight of the sodium resin sulfonate. Each of the solutions was tested to determine its viscosity. Table II identifies each copolymer by giving the percent by weight of styrene and maleic anhydride chemically combined therein and gives the viscosity, in centipoises at 25° C., of the 0.5 percent aqueous solution of the sodium resin sulfonate. In the table, styrene is abbreviated as "S" and maleic anhydride as "MA."

*Table II*

| Run No. | Copolymer | | Viscosity of Na Resin Sulfonate Solution, cps. at 25° C. |
|---|---|---|---|
|  | Percent S | Percent MA |  |
| 1 | 95 | 5 | 600 |
| 2 | 84 | 16 | 14 |
| 3 | 80 | 20 | 8 |
| 4 | 73 | 27 | 5 |
| 5 | 72 | 28 | 5 |
| 6 | 68 | 32 | 3 |

It will be noted that a decrease below about 15 percent in the proportion of maleic anhydride in the copolymer composition resulted in a large increase in the viscosity of the aqueous solutions of the sulfonated resin products. This is believed to be due to an increase in the extent of cross-linkage formation between the polymer molecules during the sulfonation as the composition of the copolymers is varied to approach that of polystyrene.

EXAMPLE 3

Another pair of experiments were carried out as in Example 2, except that the alkenyl aromatic resins employed were copolymers of ar-vinyltoluene and maleic anhydride. Table III identifies each copolymer by giving the percent by weight of vinyltoluene and maleic anhydride chemicaly combined therein. The table gives the viscosity, in centipoises at 25° C., of a 0.5 weight percent aqueous solution of the sodium resin sulfonate obtained in each experiment. Abbreviations employed in the table have the meanings given in the preceding examples.

*Table III*

| Run No. | Copolymer | | Viscosity of Aqueous Solution of Na Resin Sulfonate, cps. at 25° C. |
|---|---|---|---|
|  | Percent VT | Percent MA |  |
| 1 | 93 | 7 | 15 |
| 2 | 84 | 16 | 9 |

It will be noted that the aqueous solutions of sulfonated vinyltoluene-maleic anhydride copolymers shown in Table III are of lower viscosity than the aqueous solutions of sulfonated styrene-maleic anhydride copolymers of nearly the same maleic anhydride content shown in runs 1 and 2 of Table II. This difference is attributed to the vinyltoluene copolymers being more resistant to formation of cross-linkages between the polymer molecules during the sulfonation than are corresponding copolymers of styrene.

EXAMPLE 4

Each of a series of copolymers of ar-vinyltoluene and acrylonitrile was sulfonated with sulfur trioxide at a temperature of $-10°$ C. using liquid sulfur dioxide as the reaction medium and each of the resulting granular resin sulfonic acids was dissolved in water and neutralized with sodium hydroxide to form an aqueous solution containing 0.5 percent by weight of its sodium salt. The viscosity of each such aqueous solution was determined. The procedure in carrying out these operations was similar to that described in Example 1. Prior to the sulfonation, a portion of each of the copolymer starting materials was tested to determine its "solution viscosity," i. e. the viscosity in centipoises at 25° C. of a solution of 10 weight percent of the copolymer in toluene. The solution viscosity values are indicative of the relative average molecular weights of the copolymers, i. e. the solution viscosities increase with increase in the molecular weight. It may be mentioned that all of the unsulfonated copolymer starting materials were readily dispersible in liquid sulfur dioxide. Table IV identifies each vinyltoluene-acrylonitrile copolymer by giving the percent by weight of acrylonitrile chemically combined therein, gives the solution viscosity of each copolymer starting material, and gives the viscosity in centipoises at 25° C. of an aqueous solution of the sodium salt of the sulfonated copolymer in 0.5 weight percent concentration. Vinyltoluene and acrylonitrile are abbreviated as "VT" and "VCN," respectively.

Table IV

| Run No. | VT-VCN Copolymer | | Viscosity of Aqueous Solution of Na Resin Sulfonate, cps. at 25° C. |
|---|---|---|---|
| | Percent VCN | Solution Viscosity cps. at 25° C. | |
| 1 | 2 | 818 | 350 |
| 2 | 4 | 527 | 245 |
| 3 | 5 | 59 | 33 |
| 4 | 5 | 563 | 380 |
| 5 | 5 | 3260 | 2,400 |
| 6 | 6 | 474 | 223 |
| 7 | 10 | 76 | 110 |
| 8 | 25 | 47 | 2,400 |

From runs 3-5 of the table, it will be seen that an increase in the molecular weight, i. e. in the solution viscosity, of the copolymer starting material results in an increase in the viscosity of the 0.5 percent aqueous solutions of the sodium resin sulfonate products. The viscosity values for the aqueous sodium resin sulfonate solutions indicate that the copolymer of 75 percent vinyltoluene and 25 percent acrylonitrile employed in Example 8 became cross-linked during the sulfonation to a greater extent than the polymers of lower acrylonitrile content which were employed in the other runs of the table. All of the sulfonated products dissolved readily and completely in water, presumably to form colloidal solutions thereof.

EXAMPLE 5

A separate portion of the copolymer of 95 weight percent vinyltoluene and 5 percent acrylonitrile having a solution viscosity of 563, i. e. a copolymer of the kind and quality employed in run 4 of Table IV, was sulfonated and the product tested. The procedure was similar to that employed in Example 4, except that the sulfonation was carried out in a closed vessel under the autogenous pressure at room temperature, i. e. at about 25° C., instead of at —10° C. A 0.5 weight percent solution of the sodium salt of the sulfonated copolymer in water had a viscosity of 1980 centipoises at 25° C. This result, when compared with that obtained in run 4 of Table IV, indicates that the extent of cross-linkage formation during the sulfonation becomes greater as the sulfonation temperature is raised.

EXAMPLE 6

In each of a series of experiments, a copolymer of 95 weight percent vinyltoluene and 5 percent acrylonitrile, having a solution viscosity of 563 centipoises at 25° C., was sulfonated with sulfur trioxide at a temperature of —10° C. using liquid sulfur dioxide as the reaction medium. Each resin sulfonic acid product was dissolved in water and neutralized with sodium hydroxide to form an aqueous solution containing 0.5 weight percent of the sodium resin sulfonate. The proportion of liquid sulfur dioxide was varied from one experiment to another so that the mixtures formed by the sulfonation reaction were slurries containing the precipitated resin sulfonic acid in different proportions. Table V gives the percent by weight of granular resin sulfonic acid in the slurry of the same and liquid sulfur dioxide obtained by each sulfonation reaction and gives the viscosity in centipoises at 25° C. of an aqueous solution consisting of 0.5 percent by weight of the sodium salt of the resin sulfonic acid dissolved in water.

Table V

| Run No. | Wt. Percent of Resin Sulfonic Acid in Sulfonation Mixture | Viscosity of Aqueous Solution of Na Resin Sulfonate, cps. at 25° C. |
|---|---|---|
| 1 | 1 | 380 |
| 2 | 4 | 480 |
| 3 | 5 | 455 |
| 4 | 7 | 1,130 |

Apparently, as the proportion of the liquid sulfur dioxide reaction medium is decreased, so that the proportion of the resin sulfonic acid increases from 5 to 7 percent or higher, the formation of cross-linkages between polymer molecules during the sulfonation occurs to an increasing extent.

EXAMPLE 7

Ten grams of a copolymer of 96 weight percent vinyltoluene and 4 percent acrylonitrile was dissolved in 200 ml. of liquid sulfur dioxide and the solution was cooled to —60° C. To the cold solution there was added with stirring a solution of 5 ml. of liquid sulfur trioxide in 50 ml. of liquid sulfur dioxide which latter solution has been pre-cooled to —60° C. The resulting mixture was stirred for 45 minutes, during which time it warmed to —10° C. and the copolymer sulfonic acid was formed and precipitated. The product was separated, dissolved in water, and neutralized with an aqueous sodium hydroxide solution to form an aqueous solution containing 0.5 percent by weight of the sodium resin sulfonate. This aqueous solution had a viscosity of 400 centipoises at 25° C.

EXAMPLE 8

Ten grams of a copolymer of 90 weight percent vinyltoluene and 10 percent acrylonitrile (which copolymer had a solution viscosity in 9 times its weight of toluene of 5660 centipoises at 25° C.) was dissolved in 400 ml. of liquid sulfur dioxide to form a solution having a temperature of —10° C. This copolymer solution was added, in from 5 to 10 minutes and with stirring, to a solution of 5 ml. of liquid sulfur trioxide and 850 ml. of liquid sulfur dioxide that was also at a temperature of —10° C. During the addition, the copolymer sulfonic acid was formed and precipitated. The product was separated, dissolved in water and neutralized with sodium hydroxide to form an aqueous solution containing 0.5 weight percent of its sodium salt. This aqueous solution had a viscosity of 1170 centipoises at 25° C.

EXAMPLE 9

The alkenyl aromatic resin employed in this experiment was a copolymer of 75 weight percent of vinyltoluene and 25 percent ethyl acrylate. Its solution viscosity, i. e. the viscosity of a 10 weight percent solution of the same in toluene, was 10.5 centipoises at 25° C. Ten grams of the copolymer was dissolved in 400 ml.

of liquid sulfur dioxide at −10° C. This copolymer solution and a solution of 4.3 ml. of liquid sulfur trioxide in 400 ml. of liquid sulfur dioxide cooled to −10° C. were simultaneously fed to a vessel initially containing 500 ml. of liquid sulfur dioxide, while stirring the resulting mixture. The additions were made in about 12 minutes. The copolymer sulfonic acid thus formed and precipitated was separated, dissolved in water, and neutralized with sodium hydroxide to form an aqueous solution containing 0.5 weight percent of its salt. This aqueous solution had a viscosity of 5 centipoises at 25° C.

EXAMPLE 10

The alkenyl aromatic resin employed in this experiment was a copolymer of 75 percent vinyltoluene and 25 percent methyl methacrylate. Its solution viscosity in 9 times its weight of toluene was 14.6 centipoises at 25 C. A solution was prepared by dissolving 8.4 grams of the copolymer in 350 ml. of liquid sulfur dioxide cooled to −10° C. Another solution was prepared by dissolving 4.5 ml. of liquid sulfur trioxide in 350 ml. of liquid sulfur dioxide at −10° C. The two solutions were fed simultaneously and in about 10 minutes to a vessel which initially contained 405 ml. of liquid sulfur dioxide at a temperature of −10° C., while stirring the resulting mixture. The copolymer sulfonic acid was formed and precipitated during the addition. The product was separated, dissolved in water, and neutralized with sodium hydroxide to form an aqueous solution containing 0.5 percent by weight of its sodium salt. This aqueous solution had a viscosity of 5 centipoises at 25° C.

We claim:

1. A method for the production of water-soluble resin sulfonates which comprises admixing, with liquid sulfur dioxide, a solid thermoplastic polymer containing in chemically combined form a total of at least 60 percent by weight of at least one mono-alkenyl aromatic compound having from 2 to 3 carbon atoms in its alkenyl group, which alkenyl group comprises a vinylidene radical and is attached directly to a carbon atom of the aromatic nucleus, and containing in the polymer molecule radicals, selected from the class consisting of carbonyl, carbonyloxy and nitrile radicals, that are effective in solubilizing the polymer with respect to liquid sulfur dioxide as a medium, which polymer containing the solubilizing radicals is capable of being dispersed by stirring in 19 times its weight of liquid sulfur dioxide to form a true to colloidal solution that is clear to cloudy in appearance and is free of a distinct separate layer and is also free of a precipitate of resinous material, forming such solution of the polymer in the liquid sulfur dioxide, and mixing with the solution at least 0.7 molecular equivalent of sulfur trioxide per molecular equivalent of alkenyl aromatic compound chemically combined in the resin while maintaining the mixture at a reaction temperature not higher than 40° C.

2. A method, as claimed in claim 1, wherein the liquid sulfur dioxide-dispersible polymeric starting material is one having at least 60 percent by weight of a nuclear alkylated mono-alkenyl aromatic compound of the benzene series chemically combined therein, from 0.8 to 2 molecular equivalents of sulfur trioxide are employed per molecular equivalent of mono-alkenyl aromatic compound chemically combined in the polymer, the polymer is dispersed in liquid sulfur dioxide, the sulfur trioxide is dissolved in at least an equal weight of liquid sulfur dioxide, the two liquid bodies thus formed are admixed with one another to form a mixture which is at a reaction temperature between −40° and 30° C. and which contains at least 9 parts by weight of liquid sulfur dioxide per part of the polymer starting material, and the mixture is maintained at reaction temperatures between −40° and 30° C. until a sulfonic acid of the polymer has been formed and precipitates from the mixture.

3. A method, as claimed in claim 2, wherein the mono-alkenyl aromatic compound chemically combined in the polymer consists essentially of ar-vinyltoluene.

4. A method for the production of water soluble resin sulfonates which comprises admixing, with liquid sulfur dioxide, a solid thermoplastic polymer containing in chemically combined form at least 60 percent by weight of ar-vinyltoluene and also containing in the polymer molecule radicals, selected from the class consisting of carbonyl, carbonyloxy and nitrile radicals, that are effective in solubilizing the polymer with respect to liquid sulfur dioxide as a medium, which polymer containing the solubilizing radicals is capable of being dispersed by stirring in 19 times its weight of liquid sulfur dioxide to form a true to colloidal solution that is clear to cloudy in appearance and is free of a distinct separate layer and is also free of a precipitate of resinous material, forming such solution of the polymer by agitating the mixture, forming a separate solution of sulfur trioxide in at least an equal weight of liquid sulfur dioxide, mixing the polymer solution and the sulfur trioxide solution with one another in proportions such as to bring together from 0.8 to 2 molecular equivalents of sulfur trioxide and the polymer in amount containing 1 molecular equivalent of the chemically combined ar-vinyltoluene while maintaining the resulting mixture at reaction temperatures between −10° and 30° C., whereby the polymer is sulfonated and its sulfonic acid precipitates from the mixture, separating the polymer sulfonic acid and neutralizing it with an alkali to obtain a water-soluble salt thereof.

5. A method, as claimed in claim 4, wherein the liquid sulfur dioxide soluble polymeric starting material is a copolymer of from 65 to 98 percent by weight of ar-vinyltoluene and from 2 to 35 percent of acrylonitrile.

6. A method, as claimed in claim 4, wherein the liquid sulfur dioxide soluble polymeric starting material is a copolymer of from 60 to 87 percent by weight of ar-vinyltoluene and from 13 to 40 percent of methyl methacrylate.

7. A method, as claimed in claim 4, wherein the liquid sulfur dioxide soluble polymeric starting material is a copolymer of 75 percent by weight of ar-vinyltoluene and 25 percent of ethyl acrylate.

8. A method, as claimed in claim 4, wherein the liquid sulfur dioxide soluble polymeric starting material is a copolymer of from 68 to 95 percent by weight of ar-vinyltoluene and from 5 to 32 percent maleic anhydride.

References Cited in the file of this patent

UNITED STATES PATENTS

| | | |
|---|---|---|
| 2,475,886 | Goebel | July 12, 1949 |
| 2,645,621 | D'Alelio | July 14, 1953 |
| 2,691,644 | Roth | Oct. 12, 1954 |